United States Patent [19]

Lisimaque

[11] Patent Number: 5,175,424
[45] Date of Patent: Dec. 29, 1992

[54] TAMPER-PROOF CARD ASSOCIATING A HIGH STORAGE DENSITY INFORMATION MEDIUM WITH A MICROCIRCUIT, AND ITS USE IN A CARD READER

[75] Inventor: Gilles Lisimaque, Potomac, Md.

[73] Assignee: Gemplus Card International, Gemenos, France

[21] Appl. No.: 677,569

[22] Filed: Mar. 29, 1991

[30] Foreign Application Priority Data

Apr. 2, 1990 [FR]  France ................. 90 04175

[51] Int. Cl.$^5$ .................. G06K 19/06; G06K 5/00; G07D 7/00
[52] U.S. Cl. ............................ 235/492; 235/375; 235/380; 235/449; 235/493; 340/825.34
[58] Field of Search ........... 235/492, 493, 494, 436, 235/375, 380, 449; 340/825.34

[56] References Cited

U.S. PATENT DOCUMENTS

| | | | |
|---|---|---|---|
| 4,682,794 | 7/1987 | Margolin | 283/82 |
| 4,683,372 | 7/1987 | Matsumoto | 235/380 |
| 4,684,794 | 8/1987 | Bito | 235/380 |
| 4,697,073 | 9/1987 | Hara | 235/492 |
| 4,701,600 | 10/1987 | Beech et al. | 235/492 |
| 4,760,245 | 7/1988 | Fukawa | 235/379 |
| 4,870,574 | 9/1989 | Limisimaque | 364/300 |
| 4,874,934 | 10/1989 | Nakahara et al. | 235/379 |
| 4,960,982 | 10/1990 | Takahira | 235/382 |

*Primary Examiner*—Eugene R. LaRoche
*Assistant Examiner*—Tan Nguyen
*Attorney, Agent, or Firm*—Pollock, VandeSande & Priddy

[57] ABSTRACT

The card has a plastic support bearing, on at least one part of its surface, a layer of recording material and a microcircuit inserted in the plastic support. The card is made tamper-proof by the setting up of an identifier code that is characteristic of the relationship between the microcircuit and the support bearing the recording layer. This code is, firstly, recorded in the memory of the microcircuit and, secondly, detectable by analysis of the support. Any detachment of the support and of the microcircuit in which the related code has been memorized prevents the checking of the two codes by coincidence. The invention can be applied notably to high storage density cards.

8 Claims, 2 Drawing Sheets

TAMPER-PROOF CARD ASSOCIATING A HIGH STORAGE DENSITY INFORMATION MEDIUM WITH A MICROCIRCUIT, AND ITS USE IN A CARD READER

BACKGROUND OF THE INVENTION

1. Field of the Invention

The invention relates to the field of high density information medium or information carrier cards, especially to magnetic cards. More particularly, an object of the invention is a tamper-proof card providing a high storage density information medium with a microcircuit.

2. Description of the Prior Art

There presently exist high storage density and low storage density magnetic cards, optic reader cards as well as cards with integrated microcircuits, all of them having the credit card format according to the ISO standard No. 7810. Each technology has advantages and drawbacks.

Thus, high density magnetic cards are inexpensive, for a high storage density, and the recorded information can be updated. However, these cards are "slow" and can be easily tampered with.

Optic reader cards allow the storage of high density information. But the updating of information is not possible. These cards are also slow and easily tampered with.

Finally, the microcircuit cards have a storage capacity that depends on the available memory.

There are also known cards with a microcircuit and a magnetic track, for example, bank cards wherein the associated readers use the microcircuit and/or the information stored on the magnetic track in one and the same application.

The problem with this type of card is that the microcircuit may be detached from the card and, as the case may be, used independently, or in connection with another card, by a fraudulent person. Furthermore, the microcircuit cannot be used to optimize the management of the magnetic medium part.

SUMMARY OF THE INVENTION

An object of the invention is a card which, in associating several technologies, leads to an easily readable high storage density information medium that, at the same time, possesses greater security and, if necessary, greater speed of access to the information elements than is the case in magnetic (and/or optic) cards without microcircuits.

According to the invention, there is proposed a tamper-proof card including a support bearing, on at least one part of its surface, a layer of recording material and a microcircuit inserted in the support. An identifier code, appropriate to the relationship between the support bearing the recording material and the microcircuit is, firstly, memorized in a tamper-proof zone of the memory of the microcircuit and, secondly, detectable by analysis of the support. The validation is acquired by the correspondence of the code read in the memory of the microcircuit and of the code detected so long as the support and the microcircuit have not been detached from each other, and the identifier code, proper to the relationship between the support bearing the recording material and the microcircuit, characterizes the deformation of the support due to the insertion of the microcircuit.

Another object of the invention is the use of the foregoing tamper-proof card in a card reader.

BRIEF DESCRIPTION OF THE DRAWINGS

The invention will be understood more clearly and other features will emerge from the following description, made with reference to the appended drawings.

DETAILED DESCRIPTION OF THE INVENTION

Figure 1:
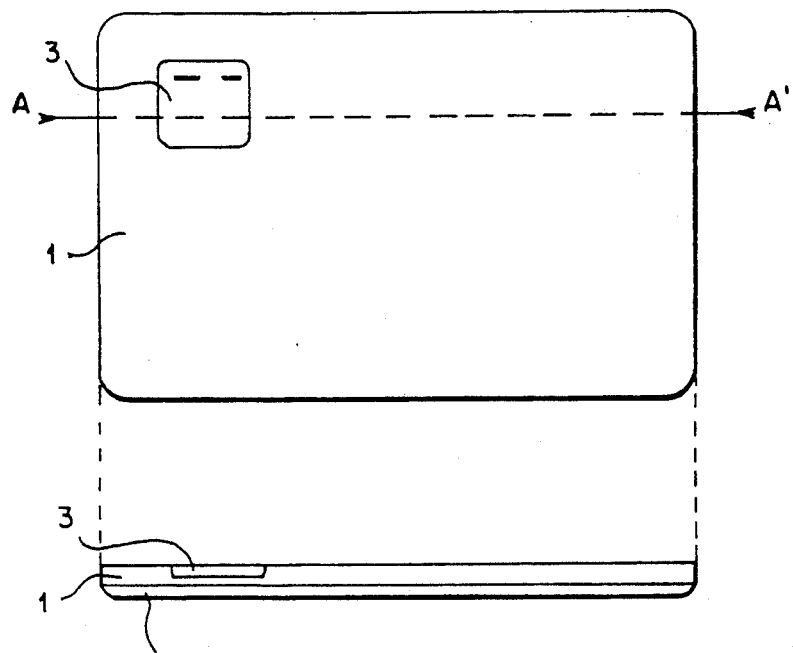
FIG. 1 gives a schematic view of a card according to the invention, in a top view and in a section along AA'.

FIG. 1 shows a card having a plastic support 1, according to the ISO standard No. 7810. On the entire rear face of this plastic support 1, there is deposited a layer of magnetic material 2 making it an information medium with high storage density. The card further has an integrated microcircuit 3 or "chip" inserted in the plastic body of the card, but having visible contact zones, on the other face of the card.

The microcircuit is inserted into the plastic support by any one of the known techniques: cold or hot bonding, milling and bonding, lamination etc. Whatever the technique used, this insertion of the microcircuit into the support is always accompanied by a permanent deformation of the structure of the plastic support particular to the card that has just been made, independent of any reversible, temporary, additional stress that might subsequently be applied to the card.

A first essential feature of the invention lies in the use of this permanent and definitive deformation to characterize the card, namely the relationship between the support bearing the magnetic layer and the microcircuit inserted into the support. This deformation enables the identification, in a unique way, of the support into which the microcircuit has been inserted.

Figure 2:
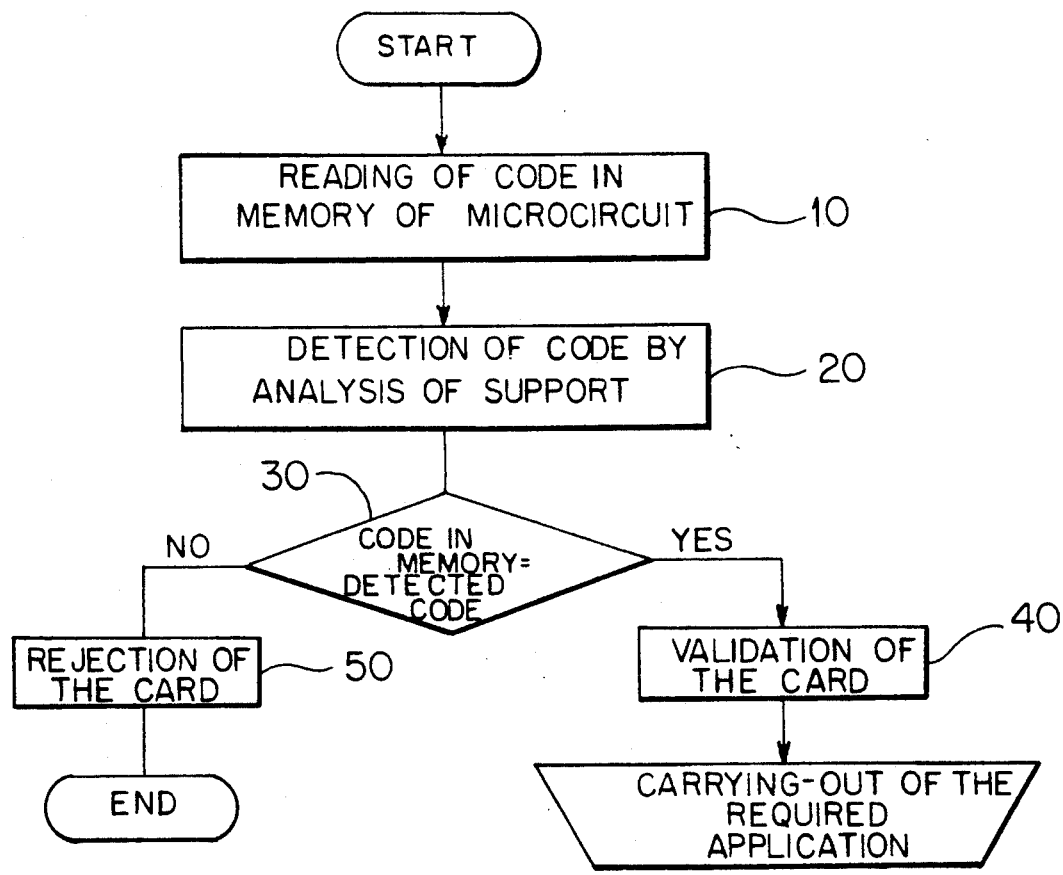
FIG. 2 illustrates the initialization of an application using a card such as this.

A second essential feature of the invention is the storage of an identifier characterizing the deformation, in the form of a code or "signature" in the tamper-proof memory of the microcircuit, i.e. in a zone that cannot be modified and to which access is possible only in a reading mode. Thus, during a use of the card, as illustrated by FIG. 2, the reading operation activates the reading of the code in the memory of the microcircuit (step 10), then a detection of the physical signature created by the deformation leading to a code detected from an analysis of the support (step 20). Through comparison with the identifier code read in the memory of the microcircuit (step 30) it is possible, in the event of coincidence, to ensure in a reliable and simple way that the microcircuit has not been detached from its initial support. The card is then validated (step 40) and the use of the card may then be authorized. Conversely, in the event of non-coincidence, the card is rejected (step 50).

The simplest way to characterize the deformation caused by the insertion of the microcircuit is the following:

if information has been recorded beforehand in the magnetic layer, it is the reading errors caused by the deformation in this layer that are detected through a reading of the medium.

conversely, if the high density medium has not yet been written on, it is the writing errors (with respect to the data that is now recorded) caused by the deformation in this layer that are detected through a reading of the medium.

The error zones are then indicated by a particular information word, and the information elements read following the indicator in these error zones may constitute the identifier code characteristic of the support/microcircuit association.

The deformation of the card can also be measured by more sophisticated methods than that of the detection of errors of reading/writing on the information track and the storage of this measurement in the memory of the circuit. However, the use of a pre-recorded measurement such as this calls for a same type of sophisticated, measuring device for its verification, making it possible to carry out the same physical measurement on the card when it is being used to enable the comparison of the read data with the recorded memory data. These measurements may be of the following types: measurement of planar deformation, measurement of optic reflection of the support or measurement of permeability. It is possible to use these methods, associated with ad hoc terminals, for optic reading cards, for there are normally no reading errors due to the deformation, or for particular instances of magnetic cards wherein a high level of verification is necessary. However, as a rule, for magnetic cards, the detection of reading errors will be sufficient.

A third additional feature of the invention is that the integrated microcircuit, in association with the high density information storage medium, may be used to substantially reduce the time of access to the information stored. Indeed, as indicated above, high density magnetic or optic media have a time of access to the information that is often too lengthy. This factor sometimes rules out "real time" applications for a variety of reasons. These reasons may be the time needed for the mechanical shifting of the reading heads when all the information preceding the useful information has to be read, the duration of synchronization, or the impossibility of rewriting on a zone already written on, with the writing of a new piece of information following the information already recorded, in a zone that has not yet been used, and hence at the end of a track. The microcircuit has a storage capacity in its memory that may be fairly limited but can be used to store indices, directories or other tables that can be used by systems of access to the information carried by the track. Thus, the capacity of the microcircuit can be used for the very speedy and selective retrieval of a piece of information on the track on the basis of a criterion or a characteristic, for example, a name, a type, an identifier that instantly activates the positioning of the reading head for example. The system using the card then benefits from high speed of access to the information. At the same time, for a microcircuit made by EEPROM technology that is erasable and re-recordable, the memory may be updated, which is very useful, the tables being frequently modified.

Figure 3:
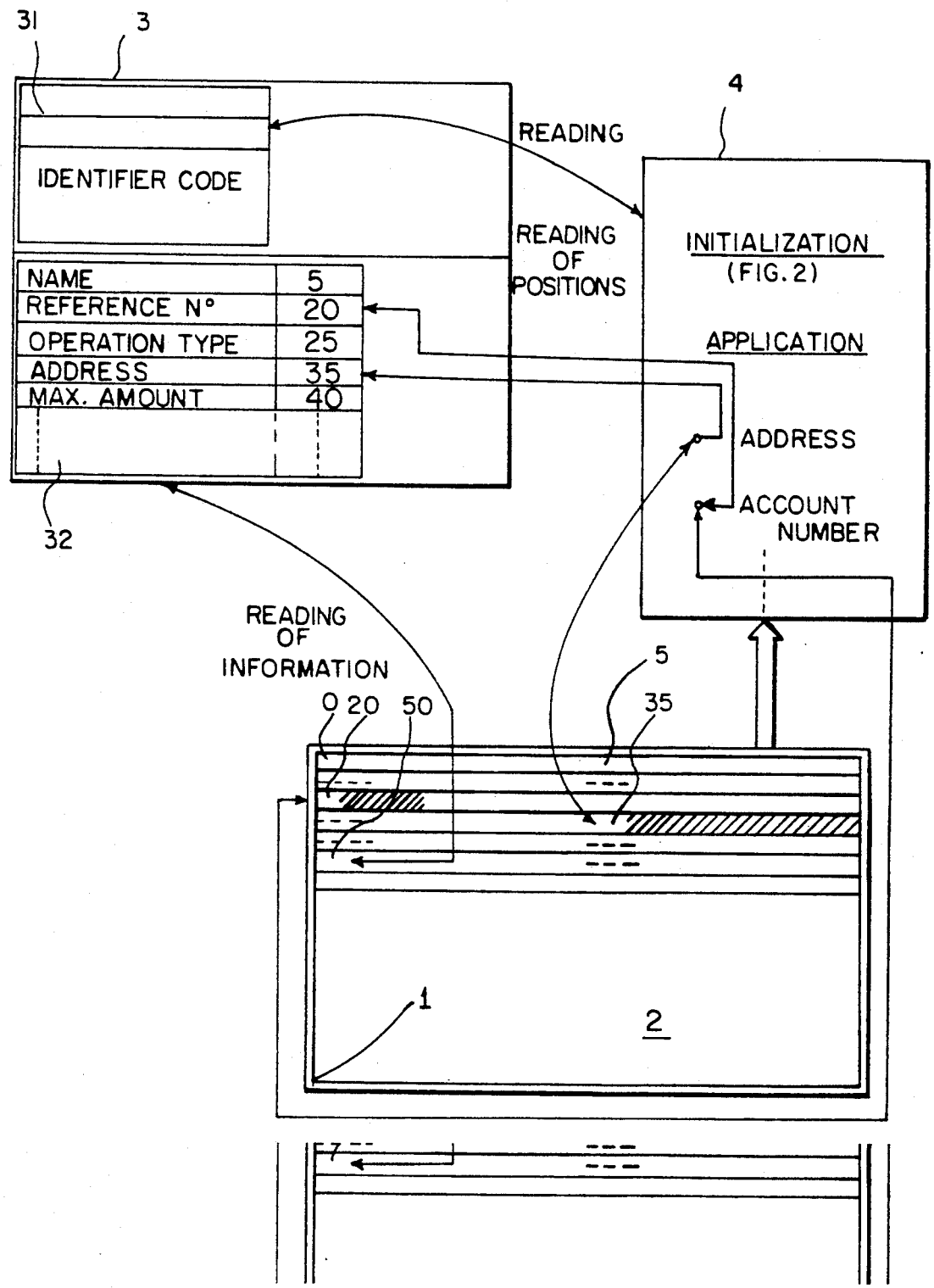
FIG. 3 illustrates the implementation of a card such as this to reduce the access time.

FIG. 3 illustrates the implementation of a card such as this, associating a microcircuit with a high density information track to reduce the time of access to the information. To make the drawing easier, the microcircuit 3 has been shown beside the support bearing the recording material (actually, it is on either side of the same support).

If the information medium is magnetically or optically readable, and if the information elements that it carries are of N possible types, then the medium has at least N fields, the start of each of these fields being identifiable by the position of the reading head associated with it. For example:

one field is associated with the name of the bearer;
one field is associated with a reference, an account number for example;
one field is associated with a type of operation;
one field is associated with an address slot;
one field is associated with a maximum amount entailed in an operation, etc.

In addition to the tamper-proof zone 31, the memory of the microcircuit has an erasable and re-recordable zone 32 in which there are memorized, along with the names of the fields, the reference numbers of zones corresponding to the starting points of the fields, directly related to associated positions of the reading head as shown in FIG. 3.

An application using the card after insertion in a reader 4 and initialization requires, for example, firstly the reading of the address. The reader activates the reading of the corresponding field by the positioning of the reading head on the zone marked for this code in the table memorized in the microcircuit, namely 35 in the example shown. Then, if the account number has to be read, the application could, immediately after the reading of the corresponding zone number, i.e. No. 20, in the memory of the microcircuit, position the reading head on this zone without requiring a complete scanning of the support track. Thus, the application using the card has fast access, through the tables memorized in the microcircuit, to the information recorded on the high density storage track.

In such a configuration, the microcircuit is therefore used to store management information needed to obtain an optimum speed for the application, the data information elements themselves being stored in the high density information medium layer. When a parameter is modified, the writing of this parameter after previously recorded information, for example at the position 50, will be carried out, and the corresponding table in the erasable and re-recordable memory of the circuit will be updated. The information, for example the address whose length might have changed, will then be read instantaneously in the right zone by the suitably positioned reading head (position 50).

Thus, the card obtained combines the advantages of a high density information medium with fast access and a means of managing this information optimally, thereby avoiding the defect inherent in purely optic and/or magnetic media, namely the slowness of the access to the information owing to the sequential reading of the zones.

The invention is not restricted to the above description which has been given as a non-restrictive example. In particular, the foregoing relates to a magnetic or optic medium with high storage density. In practice, tamper-proof association may use a microcircuit inserted into a support on which an optic reading zone and a magnetic reading zone may be provided for simultaneously. The microcircuit contains, in its tamper-proof memory, the identifier code or signature proper to the medium/microcircuit association and, in one zone, which may be erasable and re-recordable, management information in the form of tables, directories or indices associated, on the one hand, with the optic reading zone and, on the other hand, with the magnetic reading zone.

The tamper-proof card according to the invention may also have only one magnetic or optic track. In this case, the essential feature of the invention, relating to the setting up of an identifier code after the insertion of the microcircuit, and to its memorization in the microcircuit, provides for the security of the card. By contrast, the additional feature relating to the storage of information for the management of the medium does not need to be used in this case, inasmuch as the access time is sufficient for the applications envisaged.

What is claimed is:

1. A tamper-proof card including a flat support bearing on at least one part of a first surface, a layer of recording material, and on a second surface opposite to the first surface, a microcircuit inserted in the support, said microcircuit having an identifier code which identifies a relationship between the recording material and the microcircuit, memorized in a tamper-proof zone of a memory of the microcircuit, said identifier code being detectable by analysis of the layer of recording material at a location situated in opposite the microcircuit, a validation of the card being obtained when said code read from the memory of the microcircuit is equal to the code detected in the layer of recording material, indicating the support and the microcircuit have not been detached from each other, said identifier code being a function of the relationship between the support bearing the recording material and the microcircuit, representing a deformation of the support due to an insertion of the microcircuit into the support.

2. A card according to claim 1, wherein the identifier code representing the deformation is derived from read/write errors generated by the deformation of the support.

3. A card according to claim 1, wherein the information representing the deformation is obtained through means for measuring the deformation of the support.

4. A card according to any claims 1, 2, or 3, wherein the memory of the microcircuit includes a memory zone, initially stored with management information relating data which is characteristic of data fields to positions of a reading head, permitting selective access to the data carried by a layer of recording material through positioning the reading head.

5. A card according to claim 4, wherein the management information is recorded in a memory zone of the microcircuit that is erasable and re-recordable, and wherein the data carried by a track of a layer of recording material is updated by recording in zones where no recording has been made to update the corresponding management information in the microcircuit memory.

6. A card according to any of claims 1, 2, or 3, wherein the recording material is a magnetic material.

7. A card according to any of the claims 1, 2, or 3, wherein the recording material is an optic reading material.

8. The card according to claim 1 implemented in a system where a card reader detects the identifier code from the relationship between the flat support and the microcircuit, and compares the code detected with the code memorized in the microcircuit, the card being validated only in the event of a coincidence between said detected identifier code and said memorized code.

* * * * *